Patented May 29, 1951

2,554,934

UNITED STATES PATENT OFFICE 2,554,934

METHOD OF MANUFACTURING STRUCTURAL INSULATION

Osborn Ayers, Plainfield, N. J., assignor to Johns-Manville Corporation, New York, N. Y., a corporation of New York No Drawing. Application November 2, 1945, Serial No. 626,446

3 Claims. (Cl. 92—21)

This invention relates to structural thermal insulation products, and is more particularly concerned with an improved method of producing strongly bonded thermal insulation articles of comparatively low density and high strength characteristics.

In the United States patent of George B. Brown, No. 2,326,516, filed August 10, 1943, a process is described which is widely practiced for producing structural insulation articles having densities normally lying in the range 35–45 lbs. per cubic ft. and having a transverse strength or modulus of rupture of the order of 1200–1500 lbs. per square inch. The process includes the step of forming a dilute aqueous slurry incorporating a major proportion of asbestos fibers including amosite asbestos, and minor stoichiometric proportions of hydrated lime and finely divided silica. A charge of the slurry is partially dewatered and molded in a filter mold under a molding pressure of several hundred pounds per square inch to form a green preform shape having sufficient wet strength to withstand normal handling. The green preform shape is then transferred to a steam autoclave wherein it is subjected to a curing treatment to develop a hydrous calcium silicate bond, as by direct contact for several hours with saturated steam under pressures of the order of 100–150 lbs. per square inch. The cured sheet or block is finally dried by heating to drive off any uncombined water.

Difficulties have been encountered in attempting to apply the simple procedural steps of the Brown patent method to the production of thermal insulating articles having dry densities much below 30 lbs. per cubic ft., because it has not been found possible to develop suitable strength and handling characteristics in green preforms molded under the lower molding pressures required for forming such low density articles, to permit of handling by the indicated method following the filter molding operation.

An object of the present invention is to overcome the aforementioned difficulties in producing articles having dry densities substantially below 30 lbs. per cubic ft. by a method involving formation of a green preform of suitable wet strength to permit of normal handling and transfer operations.

Another object is to provide a simple and economical method of producing molded fibro-cementitious insulation articles of low dry density and high strength characteristics.

A still further object is to provide changes in molding mixture composition whereby structural insulation articles incorporating a hydrated calcium silicate binder may be substantially improved with respect to density-strength characteristics.

With the above objects in view the invention consists in the improved method of manufacturing thermal insulation articles which is hereinafter described and more particularly defined by the accompanying claims.

For the preparation of suitable thermal insulation articles in accordance with the present invention, a suitable base composition is one including about 30–60% by weight of clean and well-opened asbestos fibers, including a substantial amount of amosite fibers, and approximately stoichiometric proportions of hydrated lime and of finely divided diatomaceous silica. The fibrous component of the mixture may include substantial proportions of chrysotile or shredded wood fibers. The binder is preferably modified by incorporating therein small approximately reactive proportions of sodium silicate and of calcium chloride. Sodium silicate is preferably included in the original molding mixture in amount ranging between 1% and 10% of dry silica equivalent based on the dry weight of the finished article.

According to the preferred procedure, a dilute aqueous slurry is first formed by mixing together refined and well-opened asbestos fibers, including amosite fibers, water, and a commercial sodium silicate of high silica content. A suitable slurry mixture is one containing say 2500 parts by weight of water, 200 parts by weight of amosite asbestos fibers, and 200 parts by weight of a commercial solution of sodium silicate of 42° Bé. gravity containing $Na_2O$ and $SiO_2$ in the ratio of 1/3.22. The slurry is thoroughly agitated to effect uniform distribution of the sodium silicate over the surfaces of the fibers. There is then added to the slurry about 50 parts by weight of calcium chloride suspended in 100 parts by weight of water. After addition of the calcium chloride the slurry is agitated at normal temperature for a period sufficient to develop a reaction decomposing the sodium silicate and forming sodium chloride and a voluminous precipitate of hydrous calcium silicate while liberating excess silica as a hydrous silica gel. To the thus reacted slurry there is then added approximately 100 parts by weight of finely divided natural or calcined diatomaceous silica, and 100 parts of hydrated lime. The slurry is thoroughly agitated to effect uniform distribution of the binder materials over the surfaces of the fibers.

A measured charge of the slurry is introduced to a filter mold, and the mold charge is partially dewatered and shaped under mechanical pressure of a piston or press member to form a preform of predetermined density and dimensions. A preform thus formed under a maximum molding pressure of say 100 lbs. per square inch retains a high proportion of water and yet possesses ample hardness and physical strength to withstand manual or mechanical handling and transfer from the filter mold to a steam curing chamber. Such preform may have, for example, the dimensions of a structural building sheet of approximately 36" x 96" face area and 1 inch thickness. The green preform is transferred directly from the filter mold to an autoclave and is therein subjected to several hours heating in an atmosphere of saturated steam at a temperature equivalent to a steam pressure between 40 and 150 lbs. per square inch. At the end of this steam curing treatment the cured article is removed from the curing autoclave and is subjected to a drying operation at a temperature sufficient to insure removal of all uncombined water.

The presence of sodium silicate solution of about 40° Bé. gravity in the molding slurry in amount representing about 5%–30% by weight based on the total weight of solids in the molding mixture has the effect of improving the wet strengths of the preforms to the point where they can withstand handling and transfer, even when the preforms are formed under comparatively low molding pressures adapted for producing articles of dry densities as low as 20 lbs. per cubic ft. or lower. By the present method articles having densities of 20 lbs. per cubic ft. have in their green preform state hardness and handling properties equivalent to the preforms heretofore produced in forming articles of 40 lbs. per cubic ft. dry density.

The hydro-silicic acid gel which is formed by reacting the sodium silicate with the calcium hydrate or calcium chloride present in the molding slurry not only has substantial wet bonding strength, but also has substantial water retaining capacity and bulk imparting properties. As illustrating the effect of the calcium chloride which is preferably incorporated in the molding mixture by the present process, tests were run of molding mixtures with and without calcium chloride with the following results: A structural sheet having a dry density of 27.1 lbs. per cubic ft. and a modulus of rupture of 510 lbs. per square inch was produced from a molding slurry incorporating 2 parts by weight of amosite asbestos fibers, 0.3 part of 42° Bé. sodium silicate, 1.15 parts hydrated lime, 1 part diatomaceous silica and 11.7 parts water, using a preform molding pressure of 100 lbs. per square inch. A structural sheet of 27 lbs./cu. ft. dry density and having a modulus of rupture of 780 lbs. per square inch was produced following the same procedure and with the same molding pressure, using a molding slurry consisting of 2 parts by weight of amosite asbestos fibers, 0.3 part of 42° Bé. sodium silicate, .075 part calcium chloride, 1 part hydrated lime, 1 part diatomaceous silica and 7.2 parts water.

As another example, a structural sheet of 24.6 lbs. per cubic ft. density and a modulus of 320 lbs. per square inch was produced from a molding slurry incorporating 2 parts amosite asbestos fibers, 2 parts 42° Bé. sodium silicate, 2 parts hydrated lime, 1 part diatomaceous silica and 8.4 parts water. The same operating procedure produced a sheet of 22.7 lbs. per cubic ft. density and 510 lbs. per square inch modulus when using a molding slurry consisting of 2 parts amosite asbestos fibers, 2 parts of 42° Bé. sodium silicate, 0.5 part calcium chloride, 1 part hydrated lime, 1 part diatomaceous silica and 8.4 parts water.

Comparison of the dry cured sheets which were produced in the aforementioned tests, shows that the use of calcium chloride, in place of lime, as the reactant with sodium silicate, overcomes any tendency of the sheets to warp during drying or during subsequent use. The sodium chloride which is formed as a by-product in the reaction which occurs between the calcium chloride and the sodium silicate has the property of increasing the water solubility of lime, whereas sodium hydroxide, which is formed as a by-product of reaction between hydrated lime and sodium silicate, decreases the water solubility of the lime.

Since many variations may be made from the illustrative details given, without departing from the scope of the invention, it is intended that the invention should be limited only by the terms of the claims interpreted as broadly as consistent with novelty over the prior art.

What I claim is:

1. In manufacturing molded structural articles having a hydrous calcium silicate bond, the steps comprising, forming a dilute aqueous slurry mixture including asbestos fibers, sodium silicate and water, agitating the resulting mixture to effect distribution of the sodium silicate over the surfaces of the fibers, incorporating in the resulting slurry substantially reactive proportions of hydrated lime and finely divided silica, the amount of sodium silicate in said slurry approximating 1–10% dry weight of reactive silica equivalent based on the dry weight of the article, partially dewatering and shaping the mixture under pressure to form a green preform, removing the preform to a curing zone and subjecting it to direct steam cure under pressure, and finally drying the thus cured article.

2. In manufacturing a heat insulation article of low density and high transverse strength, the steps comprising, forming a dilute aqueous slurry mixture including asbestos fibers and approximately reactive proportions by weight of high silica ratio sodium silicate solution and calcium chloride and agitating the resulting mixture to promote a gel-forming reaction between the calcium chloride and the sodium silicate, incorporating in the resulting slurry mixture substantially stoichiometric proportions of hydrated lime and finely divided silica, the amount of sodium silicate in said slurry approximating 1–10% dry weight of reactive silica equivalent based on the dry weight of the article, partially dewatering and shaping the mixture under mechanical pressure to form a green preform, removing the preform to a curing zone and subjecting it to direct steam cure under steam pressures in the range 40–150 lbs. gauge pressure, and finally drying the thus cured article.

3. In manufacturing molded structural articles of low density and high transverse strength the steps comprising, forming a slurry mixture comprising 30–60% dry weight proportion of reinforcing fibers including amosite asbestos fibers, approximately reactive proportions by weight of sodium silicate of high $SiO_2$ content and calcium chloride, and water, agitating the mixture at normal temperature to promote a gel-forming reaction between the calcium chloride and the sodium silicate, incorporating in the mixture substantially stoichiometric proportions of hydrated lime and finely divided silica, the amount of sodium silicate in said slurry approximating 1–10% dry weight of reactive silica equivalent based on the dry weight of the article, shaping the mixture under pressure to form a green preform, subjecting the preform to hydration cure in a saturated steam atmosphere under pressure, and drying the thus cured article.

OSBORN AYERS.

REFERENCES CITED

The following references are of record in the file of this patent:

UNITED STATES PATENTS

| Number | Name | Date |
|---|---|---|
| 1,345,317 | Clapp | June 29, 1920 |
| 1,857,496 | Clapp | May 10, 1932 |
| 2,162,386 | Neuhof | June 13, 1939 |
| 2,247,355 | Brown | July 1, 1941 |
| 2,309,206 | Newman | Jan. 6, 1943 |
| 2,326,516 | Brown | Aug. 10, 1943 |
| 2,326,517 | Brown | Aug. 10, 1943 |
| 2,377,484 | Elmendorf | June 5, 1945 |

FOREIGN PATENTS

| Number | Country | Date |
|---|---|---|
| 5,254 | Great Britain | of 1895 |